(12) United States Patent
Fülöp

(10) Patent No.: US 9,656,632 B2
(45) Date of Patent: May 23, 2017

(54) METHOD OF OPERATING A TELEMATICS SYSTEM, AND TELEMATICS SYSTEM

(71) Applicant: AUDI AG, Ingolstadt (DE)

(72) Inventor: Tibor Levente Fülöp, München (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 14/952,579

(22) Filed: Nov. 25, 2015

(65) Prior Publication Data

US 2016/0152210 A1    Jun. 2, 2016

(30) Foreign Application Priority Data

Nov. 27, 2014  (DE) .................. 10 2014 017 573

(51) Int. Cl.
| | |
|---|---|
| G06F 7/00 | (2006.01) |
| B60R 25/102 | (2013.01) |
| B60R 25/31 | (2013.01) |
| B60R 25/01 | (2013.01) |
| B60R 25/40 | (2013.01) |
| F02N 11/08 | (2006.01) |
| F02N 11/10 | (2006.01) |
| G06Q 30/06 | (2012.01) |
| G06Q 50/30 | (2012.01) |

(52) U.S. Cl.
CPC ............ *B60R 25/102* (2013.01); *B60R 25/01* (2013.01); *B60R 25/31* (2013.01); *B60R 25/403* (2013.01); *F02N 11/0803* (2013.01); *F02N 11/101* (2013.01); *G06Q 30/0645* (2013.01); *G06Q 50/30* (2013.01); *F02N 2300/306* (2013.01)

(58) Field of Classification Search
CPC ......... B60R 25/00; B60R 25/24; B60R 25/04; G07C 2009/00404
USPC ............................ 701/36; 180/271, 272, 287
See application file for complete search history.

(56) References Cited

U.S. PATENT DOCUMENTS

| | | | |
|---|---|---|---|
| 7,042,342 B2 * | 5/2006 | Luo .................. | B60R 25/00 340/426.13 |
| 7,215,237 B1 | 5/2007 | Messerschmid et al. | |
| 7,868,745 B2 * | 1/2011 | Schmidt ............ | B60R 25/04 340/10.1 |
| 2003/0222757 A1 * | 12/2003 | Ghabra ............. | B60R 25/24 340/5.72 |
| 2008/0266051 A1 | 10/2008 | Taki et al. | |
| 2009/0207004 A1 | 8/2009 | Ziska et al. | |

(Continued)

FOREIGN PATENT DOCUMENTS

| | | |
|---|---|---|
| DE | 44 29 420 | 2/1996 |
| DE | 197 06 898 | 9/1997 |

(Continued)

*Primary Examiner* — Gertrude Arthur Jeanglaude
(74) *Attorney, Agent, or Firm* — Henry M. Feiereisen LLC

(57) ABSTRACT

In a method of operating a telematics system, the presence or absence of an unauthorized access to a motor vehicle is determined by a control unit integrated in the motor vehicle. When determining the presence of an unauthorized access to the vehicle a functional unit, integrated in the motor vehicle and configured to operate an engine start of the vehicle and/or to unlock or lock the motor vehicle, is irreversibly deactivated by the control unit in response to the unauthorized access to the motor vehicle, and specified data about the unauthorized access is sent by the control unit to a vehicle-remote server of the telematics system.

12 Claims, 2 Drawing Sheets

(56) References Cited

U.S. PATENT DOCUMENTS

2013/0097085 A1\* 4/2013 Peckover ............. G06Q 30/018
 705/50
2016/0070674 A1\* 3/2016 Hershey ................. F41H 11/02
 703/2

FOREIGN PATENT DOCUMENTS

| DE | 198 07 066 | 9/1999 |
| DE | 102006015212 | 10/2007 |
| DE | 102012013450 | 1/2014 |
| EP | 2 305 927 | 4/2011 |

\* cited by examiner

METHOD OF OPERATING A TELEMATICS SYSTEM, AND TELEMATICS SYSTEM

CROSS-REFERENCES TO RELATED APPLICATIONS

This application claims the priority of German Patent Application, Serial No. 10 2014 017 573.1, filed Nov. 27, 2014, pursuant to 35 U.S.C. 119(a)-(d), the disclosure of which is incorporated herein by reference in its entirety as if fully set forth herein.

BACKGROUND OF THE INVENTION

The present invention relates to managing access and operation of a system remotely. More specifically the invention relates to a method of operating a telematics system and a telematics system for managing access and operation of one or more vehicles remotely.

The following discussion of related art is provided to assist the reader in understanding the advantages of the invention, and is not to be construed as an admission that this related art is prior art to this invention.

In particular, from car sharing applications, it is known that users have access to a vehicle by means of so called token. A token is generally a hardware component usually incorporating an electronic chip for identification and authentication of users. The term "token" is used here for any kind of hardware which can save and transmit information for the purpose of identification and authentication. For example, a user can have a customer card in which a RFID-Chip is integrated and hold the customer card on a reading device of the motor vehicle to initiate an authentication procedure.

To verify whether a user may gain access to a vehicle via a token is permitted, telematics systems are oftentimes utilized. The term "telematics system" normally includes two data processing units which are interconnected through a telecommunication system, wherein one unit is a sender and the other unit is a receiver communicating over a media which enables communication between the sender and the receiver. For example a reading device integrated in a vehicle can communicate to a server so as the reading device reads the authentication data of the user from a token and transmits the information to a server, which checks the presence of a valid reservation for the user. In the presence of a valid reservation, the server sends a confirming signal to the reading device in the motor vehicle. As a consequence, the vehicle is unlocked and the vehicle can be started, optionally after the user has entered a code via a user interface in the vehicle.

It is desirable and advantageous to improve monitoring of vehicles whose access and driving authorization is operable through a telematics system so as to obviate prior art shortcomings.

SUMMARY OF THE INVENTION

According to one aspect of the present invention, a method of operating a telematics system includes detecting the presence or absence of an unauthorized access to a motor vehicle using a control unit integrated in the motor vehicle, and when determining the presence of an unauthorized access to the vehicle, irreversibly deactivating a functional unit, integrated in the motor vehicle and configured to operate an engine start of the vehicle and/or to unlock or lock the motor vehicle, by the control unit in response to an unauthorized access to the motor vehicle, and sending specified data about the unauthorized access to a vehicle-remote server of the telematics system by the control unit.

The control unit is in communication with the server of the telematics system. When the motor vehicle is used for example for a car-sharing application, a user can reserve the motor vehicle using an APP on a smartphone or using a computer. The reservation information is sent to the server of the telematics system. When the user, who has reserved the motor vehicle, now approaches the motor vehicle, he can transmit his user information, for example with a carrying RFID-Chip, to a reading device of the motor vehicle. This reading device can be connected, for example, to the control unit. The reading device sends the user information to the server of the telematics system, with the server of the telematics system verifying the presence of a valid reservation. In the presence of a valid reservation, the server sends respective data related to the validity of the reservation directly to the control unit or via the reading device to the control unit. In this way, the control unit is able to determine, whether the user, who is in the process of gaining access to the motor vehicle using his RFID-Chip, has a valid reservation. If affirmative, the control unit accordingly activates the functional unit, which is configured to effect an engine start of the motor vehicle and/or to unlock or lock the motor vehicle, so that the functional unit unlocks the motor vehicle and enables an engine start.

When determining, however, the presence of an unauthorized access to the motor vehicle, e.g. because of the absence of a valid reservation of the involved user, and the user has gained access to the motor vehicle, the functional unit is irreversibly deactivated in accordance with the present invention, so that the functional unit prevents unlocking of the motor vehicle and the functional unit prevents clearing of an engine start. This ensures that a user, who gained unauthorized access to the motor vehicle, is unable to move the motor vehicle away from its position.

Furthermore, by transmitting data about the unauthorized access to the vehicle-remote server of the telematics system, it is ensured that any data relating to the unauthorized access is made immediately available to the operator of a car sharing system for example.

According to another advantageous feature of the present invention, the functional unit can be deactivated by physically destroying a hardware component, required for functionality of the functional unit. Advantageously, the hardware component is a chip. For example, an electromagnetic pulse can be sent to destroy the functionality of the functional unit. As an alternative, a mechanical force can be employed to destroy the hardware component irreversibly. This ensures that a person, who gained unauthorized access to the motor vehicle, cannot start the engine of the motor vehicle under any circumstances. To restore functionality of the functional unit, it is necessary to replace the destroyed hardware component, e.g. chip. As an alternative, the functional unit may also be configured that it can be replaced only as a complete unit, when the hardware component, e.g. chip, required for operation of the functional unit, is destroyed. This can be carried out for example by a service technician. Even short circuiting the motor vehicle is not an option as a consequence of the irreversible destruction of the functional unit.

According to another advantageous feature of the present invention, the functional unit can be deactivated by erasing a software module integrated in the control unit. Advantageously, erasing of the software module is irreversible. Also in this case, a person, who gained unauthorized access to the motor vehicle, cannot start the engine. To start the engine, it is required that the erased software module of the control unit is programmed again. This can also be carried out by an authorized service technician. Unless the required software module has been programmed again, even short circuiting of the motor vehicle does not enable engine start.

According to another advantageous feature of the present invention, the presence of unauthorized access to the motor vehicle is established, when a person gains access to the motor vehicle without permitted authentication. In this context, provision can be made for additional monitoring for example, whether any of doors of the motor vehicle has been opened, or a driver's seat has been occupied, or a brake pedal has been depressed, or an start button for starting the motor vehicle has been actuated. Provision can hereby be made that the irreversible deactivation of the functional unit will be triggered only in the presence of one of the aforementioned conditions.

According to another advantageous feature of the present invention, the specified data, sent in response to the unauthorized access to the motor vehicle to the server, can relate to a position of the motor vehicle and involves sending a message about the unauthorized access. Furthermore, a unique vehicle identification may additionally be transmitted to the server. By transmitting these data to the server, it can be immediately determined which vehicle is accessed without authorization and where the vehicle is currently located.

According to another advantageous feature of the present invention, the functional unit is irreversibly deactivated when detecting a breach in a communication link between the functional unit and the control unit. Thus, the functional unit has incorporated therein a self-destructing mechanism which is triggered as soon as the communication link between the functional unit and the control unit is breached. As the control unit is configured to irreversibly deactivate the functional unit, theft protection of the motor vehicle is improved because as soon as the communication link between the control unit and the functional unit is breached, the control unit is not longer capable to irreversibly deactivate the functional unit. Therefore, as soon as the communication link between the control unit and the functional unit is breached, the self-destructing mechanism of the functional unit causes irreversible deactivation of the functional unit and unauthorized movement of the motor vehicle is prevented.

According to another advantageous feature of the present invention, the functional unit is irreversibly deactivated when detecting a supply of energy from a vehicle-internal battery, also provided for power supply to the control unit, to a vehicle-remote consumer and ascertaining a drop of an energy level of the battery below a predefined threshold value at least at a predefined rate. For example, the predefined rate may be 1 ampere per second. Advantageously, irreversible deactivation of the functional unit is triggered only when additionally ascertaining that a vehicle door, hood, or trunk has been opened. As an additional condition, it can be checked whether a driver's seat of the motor vehicle is occupied, an ignition attempt is made, or whether the brake pedal is actuated. A rapid drop of the energy level of the battery as a result of an external consumer is an indication that an unauthorized user may have tried to gain access to the motor vehicle with the aid of electric or electronic devices. Distinction is hereby made as to whether an external consumer or an internal consumer is the reason for the drop of the energy level of the battery. When the battery energy level drops due to an internal consumer, e.g. a radio or the like, conclusion is made that no manipulation attempt has occurred to gain unauthorized access to the motor vehicle.

According to another aspect of the present invention, a telematics system includes a server located at a remote location of a motor vehicle, a functional unit integrated in the motor vehicle and configured to operate an engine start of the motor vehicle and/or actuate a central locking system of the motor vehicle, and a control unit configured to determine a presence of an unauthorized access to the motor vehicle, irreversibly deactivate the functional unit in response to a determination of the unauthorized access to the motor vehicle, and to send specified data about the unauthorized access to the server in the presence of the unauthorized access to the motor vehicle.

Any advantages or benefits described above with respect to the method are also applicable to the telematics system, so repetition thereof is omitted for the sake of simplicity.

According to another advantageous feature of the present invention, the control unit can be connected to a bus system of the motor vehicle for providing data about the motor vehicle. Advantageously, the data may include an opening state of a door or a hood, state of a brake actuation, seat occupancy, and ignition. Thus, the control unit is in constant communication with the bus system of the vehicle, so that the control unit can be continuously informed about the state of the motor vehicle. The control unit is thus configured to trigger an irreversible deactivation of the functional unit while considering the current state of the vehicle.

According to another advantageous feature of the present invention, the functional unit can be configured as a replaceable module held in place by at least a latching spring of the motor vehicle. The functional unit can be formed as a printed circuit board, like a SIM-Card of a mobile phone, and held in place by the latching spring by which replacement of the functional unit is simplified. Thus, the functional unit, after being irreversibly deactivated or destroyed, can be replaced in a particularly simple manner.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
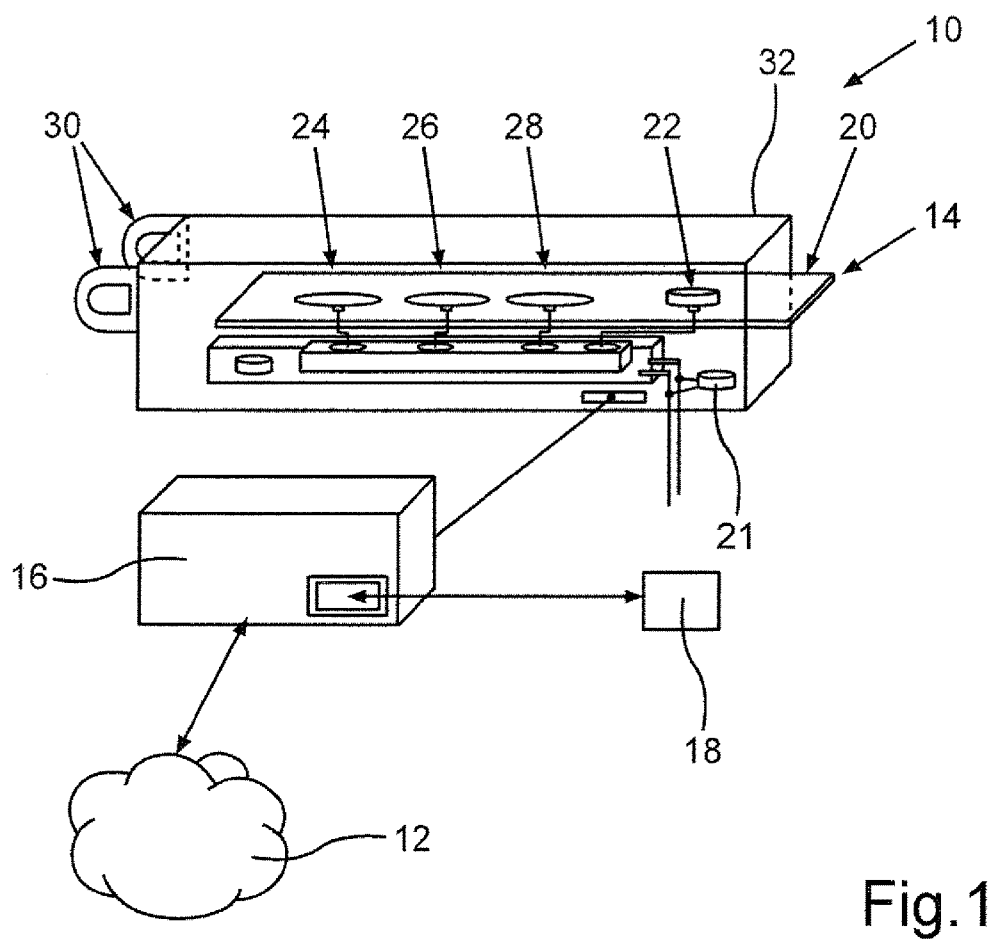
FIG. 1 is a schematic illustration of a telematics system according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a telematics system according to the present invention, generally designated by reference numeral 10. The telematics system 10 includes a server 12, located at a remote location of a motor vehicle (not shown), and a functional unit 14 which is integrated in the motor vehicle and configured to initiate an engine start of the motor vehicle and/or to activate a central locking system of the motor vehicle. In addition, the telematics system 10 includes a control unit 16 which is configured to determine the presence of an unauthorized access to the motor vehicle and to irreversibly deactivate the functional unit 14 in the presence of an unauthorized access to the motor vehicle. The control unit 16 is also configured to send the data about the unauthorized access wirelessly to the vehicle-remote server 12 in the presence of unauthorized access.

The control unit 16 has an interface to a motor vehicle bus system by which the control unit 16 is able to receive data about the motor vehicle, such as opening state of doors or hoods of the motor vehicle, brake actuation, seat occupancy, or ignition actuation of the motor vehicle. Thus, the control unit 16 is in constant communication with a bus system of the motor vehicle so as to be continuously informed about the state of the motor vehicle. The control unit 16 is configured to communicate with the functional unit 14 using a proprietary protocol.

The telematics system 10 can be used for access to the motor vehicle, in which the control unit 16 and the functional unit 14 are arranged, when authorization for a user is confirmed and for permission of an engine start. Furthermore, the telematics system 10 is configured to prevent start of the engine and therefore to disable the motor vehicle in the presence of unauthorized access to the motor vehicle.

The functional unit 14 in the non-limiting example of FIG. 1, includes a printed circuit board 20 on which a chip 22 and further functional elements 24, 26, 28 are arranged. The chip 22 is required for the functionality of the functional unit 14. As long as the chip 22 is operational, the functional unit 14 is configured to operate or allow an engine start of the motor vehicle and to lock or unlock the motor vehicle. The functional element 24 is provided to lock the motor vehicle, the functional element 26 is provided to unlock the motor vehicle, and the functional element 28 is provided to lock and unlock a trunk of the motor vehicle. The functional unit 14 further includes a dedicated power supply in form of a battery 21.

The functional unit 14 as a whole can be reliably attached to the motor vehicle by retaining elements 30 to thereby ensure a reliable and stable installation of the functional unit 14 in the motor vehicle. The retaining elements 30 are hereby arranged to a tamper-proof housing 32 in which the functional unit 14 is arranged.

Figure 2:
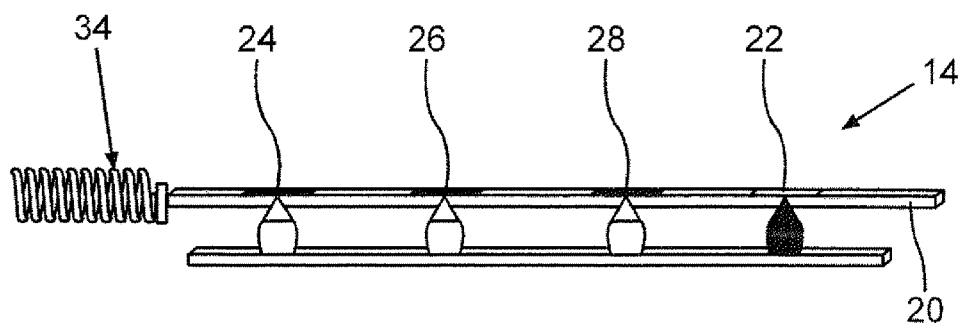
FIG. 2 is a schematic side view of the functional unit, configured to be replaceable.

FIG. 2 shows a schematic side view of the functional unit 14. Inside the tamper-proof housing 32 (not shown here), there is arranged a latching spring 34. The functional unit 14 is configured to be replaceable, with the latching spring 34 provided to securely hold the functional unit 14. The latching spring 34 may function like in a smart phone SIM-Card holding mechanism, so that the functional unit 14 can be inserted in the housing 32 or removed from the housing 32 by pushing and held in place by the latching spring 34. Thus, easy replacement of the functional unit 14 is rendered possible.

Figure 3:
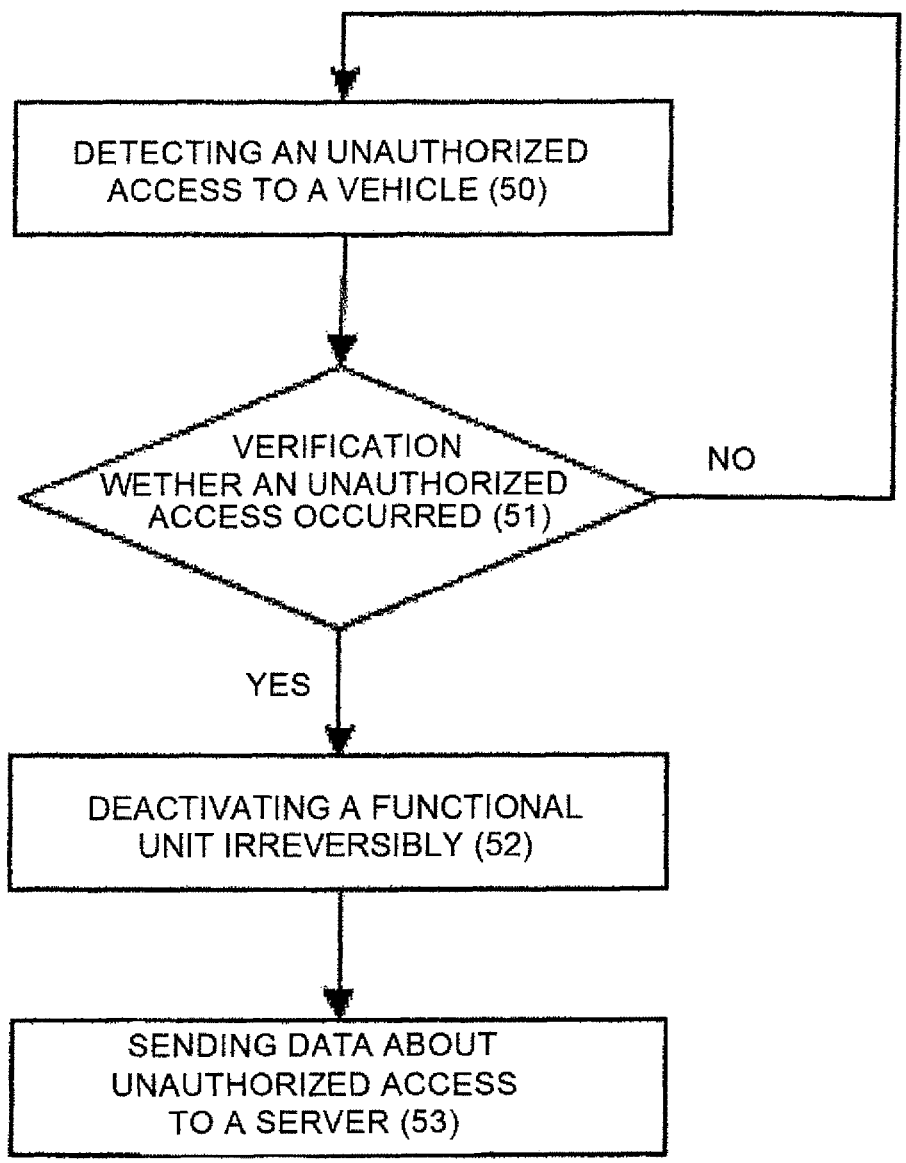
FIG. 3 is a flowchart for process flow illustrating the method of operating a telematics system in accordance with the present invention.

A method of operating a telematics system will now be described with reference to FIG. 3. The telematics system 10 may be used, for example, for a commercial car-sharing fleet. In other words, the motor vehicle in which the control unit 16 and the functional unit 14 are installed is used for car sharing. A user can reserve a motor vehicle for example using a smart phone and a respective APP. Then, the user approaches the motor vehicle and request access to the motor vehicle via a so-called token which may be a smart phone, a Bluetooth low energy dongle, a near-field communication unit, or a RFID transponder. When on the basis of this token, the presence of a valid reservation is determined, the functional unit 14 unlocks the doors, with the control unit 16 or the functional unit 14 monitoring all the following events until booking of the motor vehicle is concluded.

There may be a situation in which a user attempts to gain access to the motor vehicle without authorization (step 50). In this case, it is again initially verified (step 51), whether an authorized reservation exists from a user who would like to gain access to the motor vehicle. When the absence of a valid reservation is determined, it is checked whether a motor vehicle door has been opened, or whether a sensor has detected occupancy of a seat of the motor vehicle, or whether a brake pedal has been actuated, or, optionally, an engine start button has been actuated. When at least one of these conditions is met and additionally the absence of a valid reservation for a user has been determined, the control unit 16 irreversibly deactivates the functional unit 14 (step 52). The functional unit 14, as shown in FIGS. 1 and 2, is hereby deactivated irreversibly by physically destroying the chip 22. This can be realized, for example, by having the control unit 16 initiate sending of an electromagnetic pulse to destroy the chip 22. As an alternative, this may be realized also by mechanical force or heat, initiated by the control unit 16. It is, of course, also conceivable to use the self-destructing mechanism to irreversibly deactivate the functional unit 14.

The functional unit 14 may be configured as a software module which is integrated in the control unit 16. For deactivating the functional unit 14, the software module is erased so that the involved motor vehicle can no longer be started and therefore protects the motor vehicle against theft. The control unit 16 further sends information about the position of the motor vehicle, a motor vehicle identification, and a message about the unauthorized motor vehicle access to the server 12 of the telematics system 10 (step 53). In this way, a service team member is able to immediately recognize the presence of unauthorized access and can, optionally, inform the police department or dispatch a service technician on site.

In order to enable again start of the motor vehicle, the functional unit 14 in the form of a replaceable module, has to be exchanged by a service technician, when the chip 22 has been mechanically destroyed. Once replacement has been carried out, functionality of the functional unit 14 as a whole is restored, and the motor vehicle can be started again. When the functional unit 14 involves a software module that is integrated in the control unit 16, the service of a technician is again needed to program a new software module in the control unit 16, before the motor vehicle can be started again.

There may also be a situation, in which a voltage drop of the motor vehicle, i.e. of a battery of the motor vehicle, is encountered. When determining that a consumer external to the motor vehicle is supplied by the motor vehicle battery, which also supplies power to the control unit 16, so that the energy level of the battery drops below a predefined energy level threshold value at a rate that is faster than a predefined rate of e.g. 1 ampere per second, irreversible deactivation of the functional unit 14 is also triggered.

Advantageously, the irreversible deactivation of the functional unit 14 is triggered only when at least one of the following conditions is met: an engine hood, a door, or a hatchback of the motor vehicle has been opened, a seat occupancy sensor determines occupancy of a seat, a brake of the motor vehicle has been actuated, or a button for starting the motor vehicle engine has been actuated. When one of these conditions has been met and additionally it has been determined that because a consumer external to the motor vehicle uses the motor vehicle battery so that the energy level of the motor vehicle battery has dropped below the predefined battery energy level threshold at the predefined rate, irreversible deactivation of the functional unit 14 is triggered.

However, when determining that the energy level of the battery dropped as a consequence of an internal consumer, irreversible deactivation of the functional unit 14 is not triggered. Access to the motor vehicle and start of the engine are still permitted as long as an authorized user has been detected. Thus, it is distinguished whether the drop of the energy level of the motor vehicle battery is caused by external factors or whether the energy level drop of the battery is inadvertently caused internally by an internal consumer which has not been switched off for example.

In the event, the motor vehicle is being towed away, the following procedure is executed: As soon it has been ascertained that the motor vehicle is being towed, the control unit 16 verifies whether a motor vehicle access attempt has occurred without a valid token and sends the corresponding information about the towing of the motor vehicle to the server 12. An irreversible deactivation of the functional unit 14 can only be triggered by a person and not automatically.

There may, however, also be a situation in which an alarm system of the motor vehicle is triggered by error, for example because the motor vehicle has been hit by a ball. In this situation, the control unit 16 checks whether access to the motor vehicle is attempted without a valid token. In this case, irreversible deactivation of the functional unit 14 will be triggered. When determining the absence of an unauthorized access attempt, irreversible deactivation of the functional unit 14 does not take place.

The functional unit 14 can also be operated in a service mode, when the motor vehicle is being serviced. Activation of this service mode requires use of a special token. As soon as the technician finishes the service work, the service mode is actively terminated.

Optionally, the telematics system 10 can be utilized for continuous monitoring of a motor vehicle during operation of the motor vehicle.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method of operating a telematics system, comprising:
   detecting the presence of an unauthorized access to a motor vehicle using a control unit integrated in the motor vehicle; and
   when determining the presence of an unauthorized access to the vehicle:
   irreversibly deactivating a functional unit, integrated in the motor vehicle and configured to operate an engine start of the vehicle and/or to unlock or lock the motor vehicle, by the control unit in response to an unauthorized access to the motor vehicle, wherein the functional unit is deactivated by physically destroying a hardware component by sending an electromagnetic pulse and by applying a mechanical force, required for functionality of the functional unit, wherein the hardware component is a chip; and
   sending specified data about the unauthorized access to a vehicle-remote server of the telematics system by the control unit.

2. The method of claim 1, wherein the functional unit is deactivated by erasing a software module integrated in the control unit.

3. The method of claim 1, wherein the presence of the unauthorized access is established, when a person gains access to the motor vehicle without permitted authentication.

4. The method of claim 1, wherein the specified data, sent in response to the unauthorized access to the motor vehicle to the server, relates to a position of the motor vehicle and involves sending a message about the unauthorized access.

5. The method of claim 1, further comprising irreversibly deactivating the functional unit when detecting a breach in a communication link between the functional unit and the control unit.

6. The method of claim 5, wherein the functional unit is irreversibly deactivated by a self-destructing mechanism.

7. The method of claim 5, wherein the functional unit is irreversibly deactivated by a self-destructing mechanism when the communication link between the functional unit and the control unit is breached.

8. The method of claim 1, further comprising irreversibly deactivating the functional unit when detecting a supply of energy from a vehicle-internal battery to a vehicle-remote consumer and ascertaining a drop of an energy level of the battery below a predefined threshold value at least at a predefined rate.

9. A telematics system, comprising:
   a server located at a remote location of a motor vehicle;
   a functional unit integrated in the motor vehicle and configured to operate an engine start of the motor vehicle and/or actuate a central locking system of the motor vehicle; and
   a control unit configured to:
   determine a presence of an unauthorized access to the motor vehicle,
   irreversibly deactivate the functional unit in response to a determination of the unauthorized access to the motor vehicle, wherein the functional unit is deactivated by physically destroying a hardware component by sending an electromagnetic pulse and by applying a mechanical force, required for functionality of the functional unit, wherein the hardware component is a chip, and
   send specified data about the unauthorized access to the server in the presence of the unauthorized access to the motor vehicle.

10. The telematics system of claim 9, wherein the control unit is connected to a bus system of the motor vehicle for providing data about the motor vehicle.

11. The telematics system of claim 9, wherein the data includes an opening state of a door or a hood, state of a brake actuation, seat occupancy, and ignition.

12. The telematics system of claim 9, wherein the functional unit is configured as a replaceable module held in place by at least a latching spring of the motor vehicle.

* * * * *